July 12, 1955 — G. M. WALLER — 2,712,964
BLANK FOR TREAD UNITS
Filed Jan. 7, 1952 — 2 Sheets-Sheet 1

Inventor,
Gustav M. Waller
By: Parker & Carter
Attys.

July 12, 1955  G. M. WALLER  2,712,964
BLANK FOR TREAD UNITS
Filed Jan. 7, 1952  2 Sheets-Sheet 2
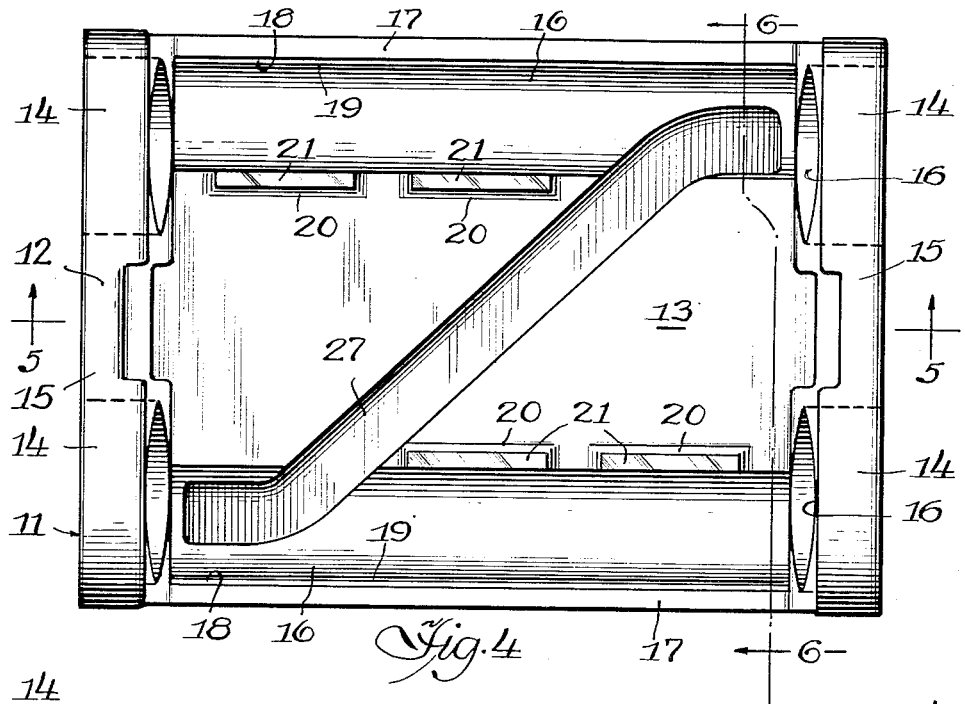
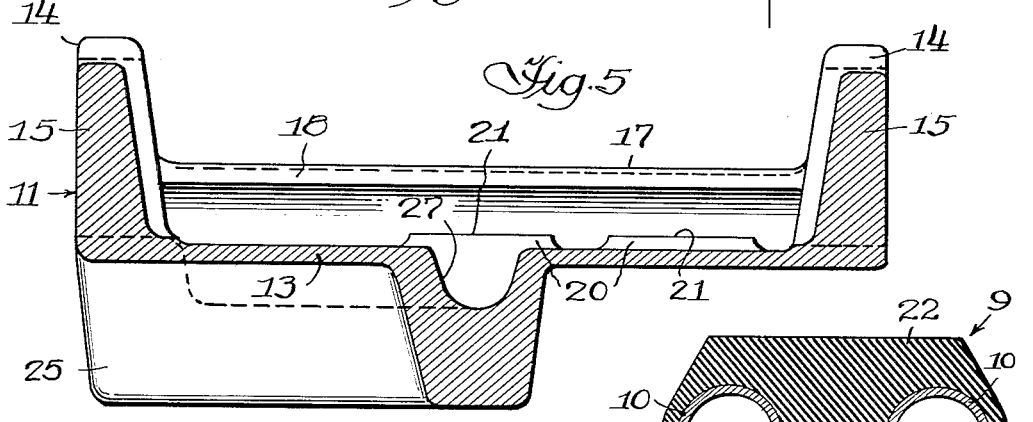
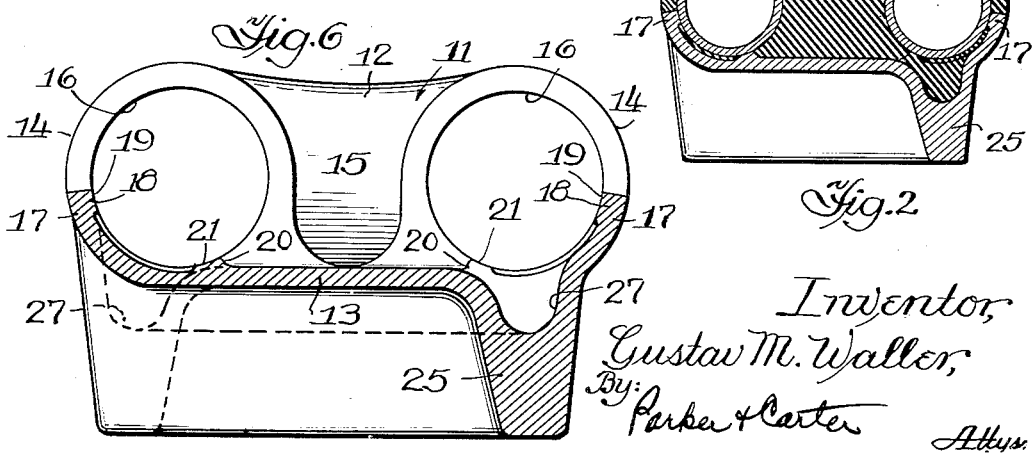
Inventor,
Gustav M. Waller,
By Parker & Carter
Attys.

United States Patent Office 2,712,964
Patented July 12, 1955

2,712,964
BLANK FOR TREAD UNITS

Gustav M. Waller, Geneva, Ill., assignor to Burgess-Norton Mfg. Co., Geneva, Ill., a corporation of Illinois Application January 7, 1952, Serial No. 265,277

2 Claims. (Cl. 305—10)

This invention relates to improvements in tread blocks for endless track treads of the kind commonly employed on military vehicles.

The principal object of the invention is to provide a simplified form of metal blank for such tread units including grouser or cleat means capable of being forged in a single piece.

Other objects of the invention will appear as the following description proceeds.

The invention may best be understood by reference to the accompanying drawings, in which:

Figure 2 is a cross section in reduced scale, taken on line 2—2 of Figure 1;

Figure 4 is a top plan view of the blank shown in Figure 3;

Figure 5 is a section taken on line 5—5 of Figure 4;

Figure 6 is a section taken on line 6—6 of Figure 4.

Figure 1:
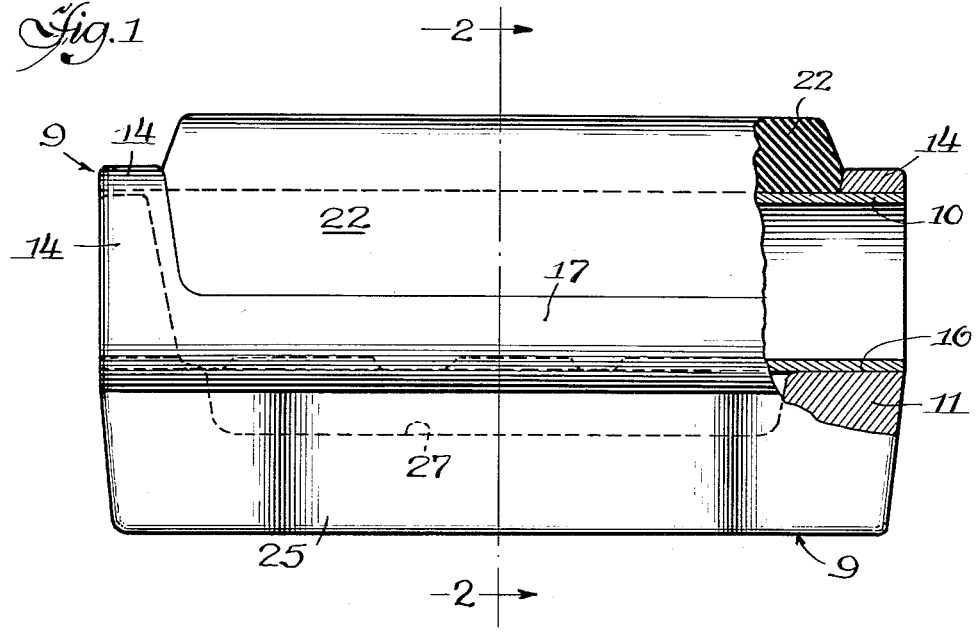
Figure 1 is a side view of a completed tread unit constructed in part from a metal blank made in accordance with my invention, with parts broken away to show in detail the fixed mounting for the ends of the pivot bearing sleeves.
Figure 3:
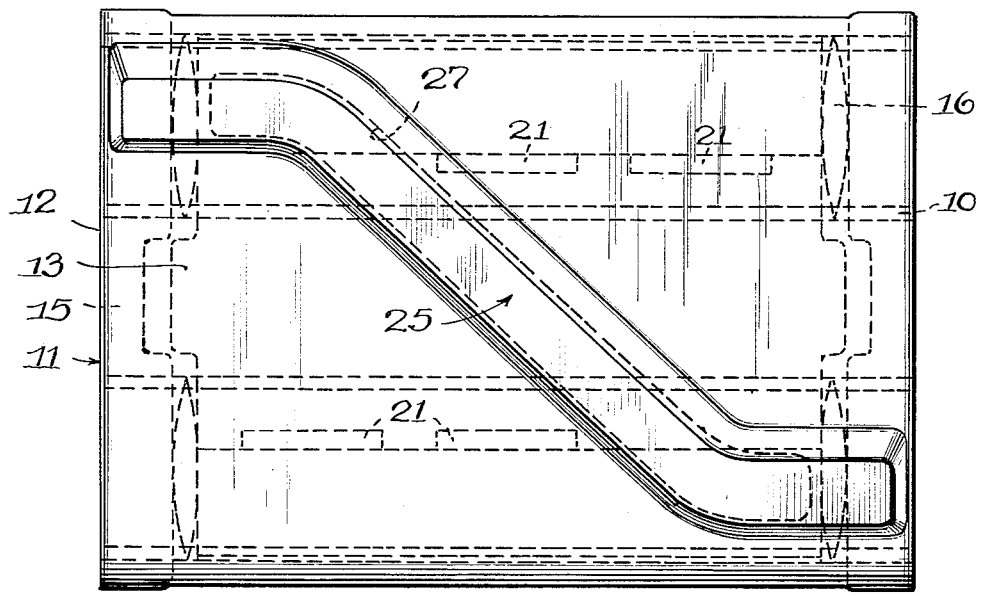
Figure 3 is a bottom plan view of the metal blank for the tread unit shown in Figures 1 and 2.

Referring now to details of the illustrative embodiment of my invention shown in the drawings, Figures 1 and 2 show a completed tread unit 9 of the kind employed in endless track for military tanks and similar vehicles. A plurality of such tread units are pivotally connected together as usual by suitable connecting devices including pivot pins (not shown) which pass through hollow sleeves 10 fixed in parallel relation at opposite ends of a metal frame 11 forming the main load-carrying element of each tread unit.

The frame 11 is initially die-formed as a blank 12, shown in Figures 3 to 6, including a generally flat horizontal web 13 having a pair of spaced upwardly projecting bearing supports 14, 14 at each end thereof joined by upright ribs 15, 15. Apertures 16, 16 are bored through said bearing supports, through which the ends of the pivot sleeves 10 are finally secured as by brazing (see Figures 1 and 2).

The web 13 is initially die-formed with upwardly curved lips 17, 17 along front and rear edges thereof. Said lips are designed to conform with the adjacent sides of the sleeves 10, 10 in the finished unit through an arc slightly less than 45 degrees to the plane of the web 13. The blank is initially formed with inwardly facing bearing ribs 18, 18 along the terminal edges of the lips 17, 17. In the finished product, these ribs are machined with arcuate surfaces 19, 19 in position to be fused as by brazing to the adjacent surfaces of said sleeves in the final assembly.

Bearing ribs 20, 20 are formed along the under face of the web 13, adapted to be machined with arcuate surfaces 21, 21 in position to provide supporting engagement for the adjacent surfaces of the sleeves 10 inwardly of the axes of the latter. The bearing ribs 20 may also be brazed to their respective sleeves. The bearing ribs 18, 18 and 20, 20, when finally machined as described, thus cooperate to provide positioning and supporting reenforcements for the sleeves 10, 10 between the end supports 14, 14 in the final assembly. As usual with many tank tread structures, the web 13 may have a block of rubber 22 molded on its upper face and filling the space between and around the sleeves 10, for engagement with the bogie wheels of the vehicle.

Referring now more particularly to the novel features of the present invention, the blank 12 from which the finished frame 11 is made includes web 13 with grouser or cleat means projecting from and formed integral with the bottom face thereof. In the illustrative form shown herein, a single grouser 25 is employed extending diagonally across said web.

The grouser 25 is slightly tapered in cross section, and the upper face of the web 13 is die-formed with an elongated recess 27 extending a substantial distance below the bottom face of the web, and into the grouser throughout the length of the latter. The recess 27 is confined to an area of the plate substantially within the limits of the bearing supports 14, 14 at the ends, and the lips 17, 17 along the sides of the blank 12, so as to permit the entire blank, including the horizontal web 13, end supports 14, connecting ribs 15, lips 17, bearing ribs 18 and 20, and grouser 25, to be produced as an integral piece in a simple forging operation.

By forming the blank as described, the finished tread unit can be made more economically and lighter in weight than comparable tread units of the standard construction heretofore used in military tanks and the like, wherein the main frame and the grouser have customarily been made of separate pieces, with the grouser finally secured as by welding to the under face of the frame. As is well known, any saving in weight of moving parts, such as the endless tread, is of great importance in vehicles of the character mentioned.

It will be understood, of course, that the grouser means, herein consisting of a single grouser 25, may be arranged in different patterns, or a plurality of grousers may be employed if desired, utilizing the same principle of recessed, die-formed grouser construction, as heretofore described.

I claim:

1. A one-piece blank for an endless tread unit, comprising a generally flat web portion having a pair of spaced upstanding pivot sleeve bearing supports at opposite ends, each having a pair of apertures therethrough for receiving opposite ends of a pair of pivot sleeves, said web also having upwardly curved lips connecting said bearing supports along opposite edges of said web, and a grouser projecting downwardly along said web portion and with a recessed upper surface open to the upper face and extending downwardly beyond the bottom face of said web portion.

2. A blank in accordance with claim 1, wherein reenforcing ribs are formed along the terminal edges of said lips and along the upper face of said web inwardly of the axes of said bearing supports adapted to be machined for supporting engagement with intermediate portions of the pivot sleeves secured at opposite ends in said upstanding bearing supports.

References Cited in the file of this patent

UNITED STATES PATENTS

| 2,353,124 | Burgess | July 11, 1944 |
| 2,375,170 | McNeil | May 1, 1945 |
| 2,548,626 | Sinclair | Apr. 10, 1951 |